US006259598B1

(12) United States Patent
Beaman et al.

(10) Patent No.: US 6,259,598 B1
(45) Date of Patent: Jul. 10, 2001

(54) METHOD OF PROVIDING AN EXTERNALLY ACCESSIBLE FLASH MEMORY CARD WITH SECURITY FEATURE IN A NETWORK COMPUTER

(75) Inventors: Daniel Paul Beaman, Cedar Park; Marvin L. Buller, Austin; Michael Edward Criscolo, Austin; Sanjay Gupta, Austin; Brian Michael Kerrigan, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,366

(22) Filed: Oct. 21, 1999

(51) Int. Cl.[7] ....................................................... H05K 1/16
(52) U.S. Cl. .......................... 361/683; 361/727; 361/685; 364/708.1; 312/216
(58) Field of Search ............................ 361/683, 724–727, 361/685, 686; 364/708.1; 248/551–553; 312/216, 218; 70/57–58, 85; 292/42, 148, 151, 307 R

(56) References Cited

U.S. PATENT DOCUMENTS

| 5,513,068 | * | 4/1996 | Girard ................................. 361/685 |
| 5,896,273 | * | 4/1999 | Varghese et al. .................... 361/724 |
| 6,067,226 | * | 5/2000 | Barker et al. ....................... 361/686 |
| 6,097,594 | * | 8/2000 | Bassett et al. ...................... 361/685 |
| 6,122,173 | * | 9/2000 | Felcman et al. .................... 361/726 |

* cited by examiner

Primary Examiner—Leo P. Picard
Assistant Examiner—Hung Van Duong
(74) Attorney, Agent, or Firm—Duke W. Yee; Robert M. Carwell

(57) ABSTRACT

A computer chassis for covering and protecting the components of a data processing system. In a preferred embodiment, the computer chassis includes a chassis bezel. The chassis bezel has a slotted opening there through for allowing a user to access a user changeable component in the data processing system. The chassis bezel is configured to accept a cover plate that will cover the slotted opening thus preventing access to the user changeable component.

16 Claims, 3 Drawing Sheets

METHOD OF PROVIDING AN EXTERNALLY ACCESSIBLE FLASH MEMORY CARD WITH SECURITY FEATURE IN A NETWORK COMPUTER

BACKGROUND OF THE INVENTION

1. Technical Field:

The present invention relates to computer systems and, more particularly, to computer chassis. Even more particularly, the present invention relates to methods of providing secure external access to flash memory cards within a computer.

2. Description of Related Art:

In a flash memory it is desired to write data in the fastest manner possible. As such, multiple bytes of data are often written to the memory in one write operation. Because flash write operations are not always successful on a first memory cell program operation, data check and rewrite operations are often employed. Thus, a write operation is conducted on a group of memory cells and the state of the memory cells following the write operation is determined. If any of the memory cells have not been written to a correct logic state, a second write operation is performed on the same memory cells. Often flash memory is implemented as flash memory cards inserted into an expansion slot within a computer system.

Typically, flash memory cards are mounted internally within the system chassis. However, certain market segments have expressed desires to have user access to the flash card from the outside of the system for serviceability and usability reasons. Continuing to mount the flash memory cards internally within the system chassis encumbers these customers access to the flash memory cards because the chassis must be disassembled to gain access to the cards. However, other market segments do not want users to have access to the flash memory cards due to reasons of theft or compromised system security.

Therefore, it is desirable to have a system that allows easy access to the flash memory card under certain circumstances that is easily convertible to a secure system disabling user's access to the flash memory card when desired by a customer.

SUMMARY OF THE INVENTION

The present invention provides a computer chassis for covering and protecting the components of a data processing system. In a preferred embodiment, the computer chassis includes a chassis bezel. The chassis bezel has a slotted opening there through for allowing a user to access a user changeable component in the data processing system. The chassis bezel is configured to accept a cover plate that will cover the slotted opening thus preventing access to the user changeable component. Once the cover plate has been mounted to the chassis bezel, access to the user changeable component may not be reestablished without opening the entire chassis. This type of access may also be denied by requiring the use of specialized non-standard tools to open the computer chassis. Thus unauthorized removal of the user changeable component may be prevented.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
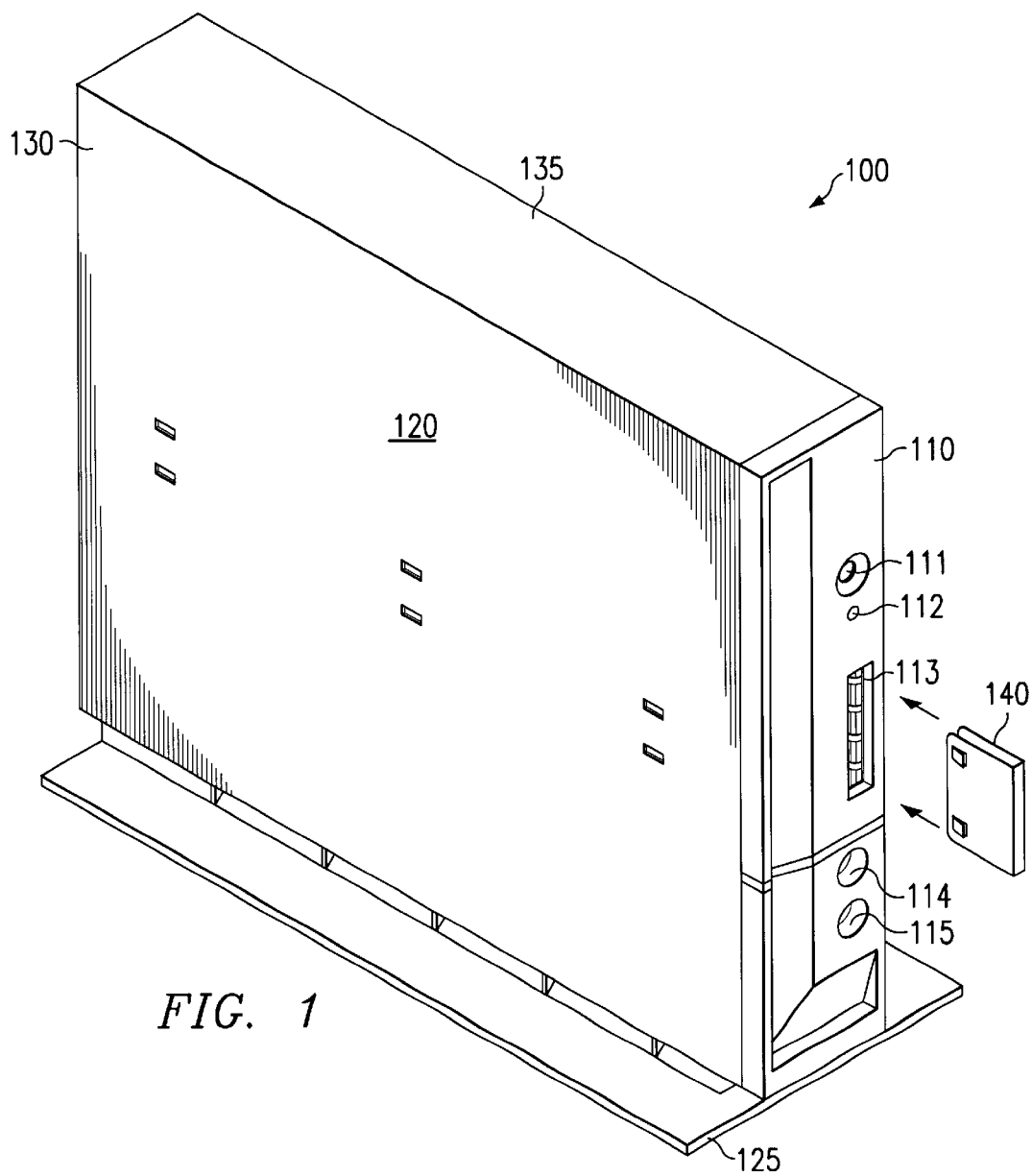
FIG. 1 shows a perspective view of a computer chassis in accordance with a preferred embodiment of the present invention.

With reference now to the figures, and in particular with reference to FIG. 1, a perspective view of a computer chassis is illustrated in accordance with a preferred embodiment of the present invention. Computer chassis 100 has a base 125 that supports computer chassis 100. Connected to base 125 is cover 120. Cover 120 is a continuous piece of material and comprises three sides: a top side 135, a right side (not shown) and a left side 130.

The front of computer chassis 100 comprises a chassis bezel 110. Preferably, cover 120, chassis bezel 110, and base 125 are constructed from the same type of material. Chassis bezel 110 includes a power on/off button 111, an LED status indicator 112, audio jack outputs 114 for connecting external audio speakers to the computer housed within computer chassis 100, a microphone input 115 for connecting an external microphone to the computer housed within computer chassis 100, and a flash memory card slot 113 for receiving flash memory cards.

Flash memory card slot 113 defines an opening through chassis bezel 110 through which a flash memory card (not shown) may be inserted. The flash memory card once inserted through flash memory card slot 113 would engage internal computer components within computer chassis 100 thus providing an electrical interface between the flash memory card and the computer allowing for communication between the computer and the flash memory card. If a user chooses to remove the flash memory card, the user merely grasps the externally accessible portion of the flash memory card that protrudes outside the surface of chassis bezel 110 and exerts a small amount of force to disengage the flash memory card from the interface thus pulling the flash memory card out through flash memory card slot 113. With the flash memory card thus removed, a new flash memory card may be inserted in its place.

Thus, by providing flash memory card slot 113, users may have access to the flash memory cards without the hassle of opening computer chassis 100 and removing the flash memory card from the interior of computer chassis 100.

Also depicted in FIG. 1 is a cover plate 140. Cover plate 140 is configured such that it slides over a flash memory card and into flash memory card slot 113. Note, cover plate 140 can be placed over the flash memory card both after the flash memory card has been inserted into flash memory card slot 113 and simultaneously with or before insertion of the flash memory card into flash memory card slot 113. Once engaged within flash memory card slot 113, cover plate 140 may not be removed by a user without opening computer chassis 100 to reveal the backside (interior) of chassis bezel 110. Thus, by using cover plate 140, access to the flash memory card may be denied thus adding additional security to the computer that may be desired by some users.

Figure 2:
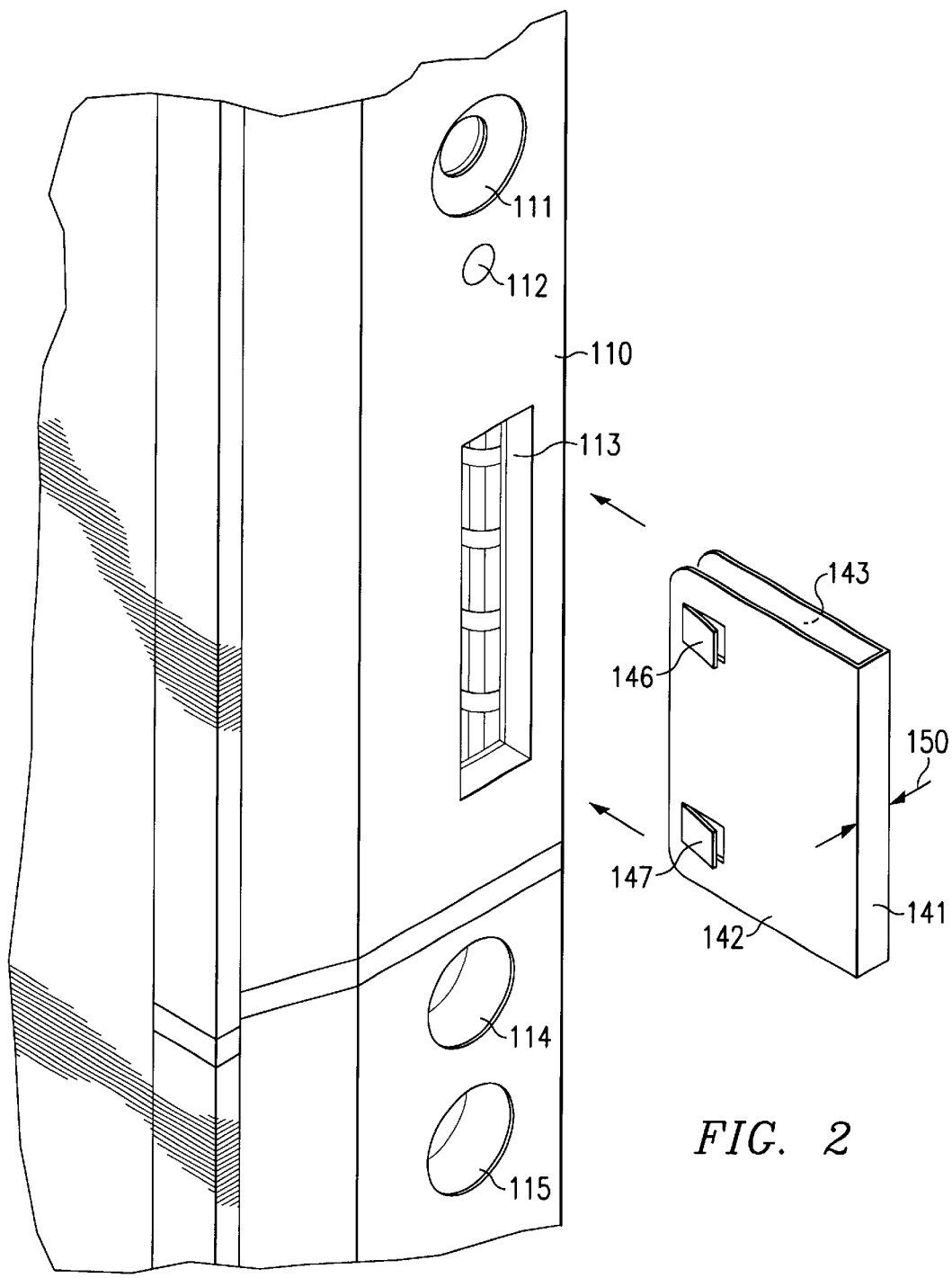
FIG. 2 shows a close up perspective view of a chassis bezel and a cover plate in accordance with a preferred embodiment of the present invention.

Turning now to FIG. 2, a close up perspective view of chassis bezel 110 and cover plate 140 is depicted in accordance with a preferred embodiment of the present invention. Cover plate 140 comprises three planer members 141-143. Planer members 142 and 143 are parallel (or at least substantially parallel) to each other. Planer members 142 and 143 are substantially orthogonal to planer member 141. Planer members 142 and 143 are separated or connected to each other via their connection to planer member 141. Except for the area in which planer member 142 is connected to planer member 143 by planer member 141, planer members 142 and 143 are separated by empty space with such thickness defined by the width 150 of planer member 141. The dimensions of the various components of cover plate 140 are determined by the dimensions of the flash memory card for which cover plate 140 is designed to enclose or encapsulate. Cover plate 140 should be of a size that may slide over the flash memory card with sufficient spatial tolerance between cover plate 140 and the flash memory card.

Cover plate 140 includes biasing members 146 and 147, which are retention clips and are typically spring back tabs, on planer member 142 and corresponding biasing members (not shown) on planer member 143. (Note, the spring back tabs may be constructed from materials such as, for example, plastic or metal). Biasing members 146 and 147 as well as those (not shown) on planer member 143 are configured such that the tabs close in response to pressure as cover plate 140 is inserted into chassis bezel 110 and spring back into place after insertion is complete. Thus, removal of cover plate 140 is precluded since the biasing members "catch" on the interior of chassis bezel 110 if removal is attempted.

Figure 3:
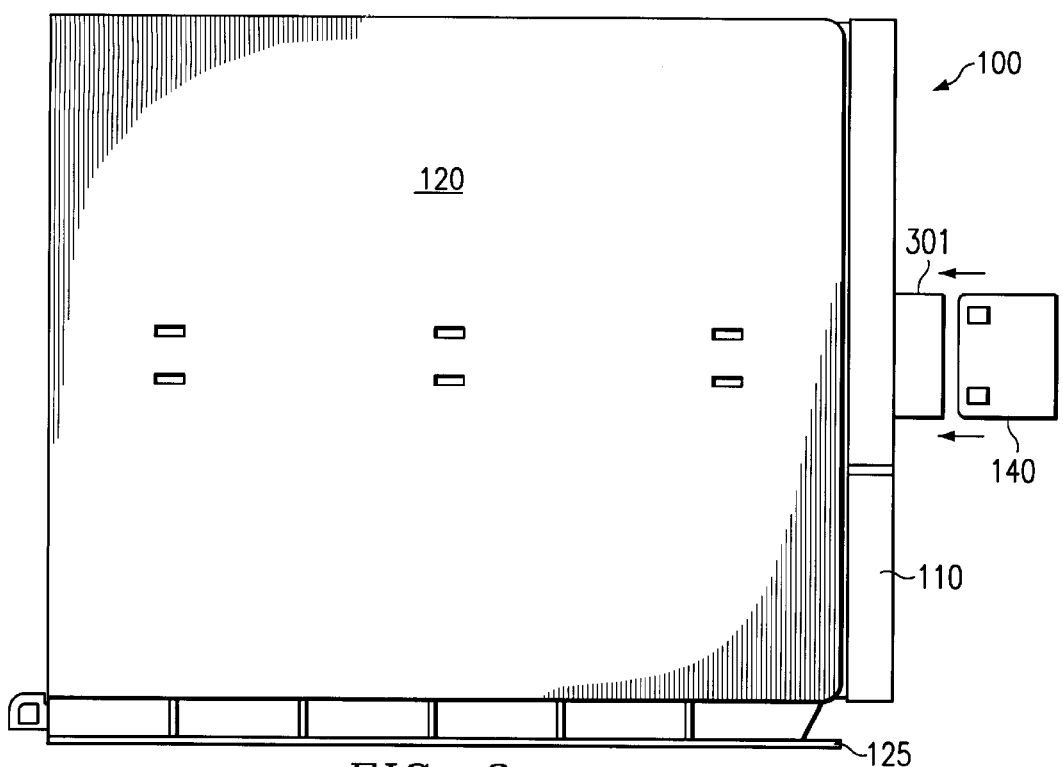
FIG. 3 shows a side view of a computer chassis in accordance with a preferred embodiment of the present invention.

Turning now to FIG. 3, a side view of computer chassis 100 is illustrated in accordance with a preferred embodiment of the present invention. In this illustration, the flash memory card 301 is shown inserted into chassis bezel 110. Cover plate 140 is shown and would be placed over flash memory card 301 as indicated by the arrows. As illustrated in FIG. 3, a portion of flash memory card 301 extends out from the surface of chassis bezel 110 allowing a user an area to grasp such that flash memory card 301 may be inserted and removed from the computer.

Figure 4:
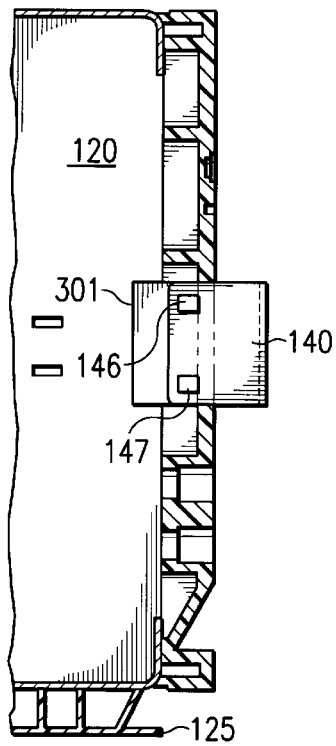
FIG. 4 shows a side cross-sectional view of a computer chassis in accordance with a preferred embodiment of the present invention.

Turning now to FIG. 4, a side cross-sectional view of computer chassis 100 is illustrated in accordance with a preferred embodiment of the present invention. In this illustration, cover plate 140 is inserted into flash memory card slot 113 over flash memory card 301. Biasing members 146 and 147 are engaged by the back side of chassis bezel 110 such that removal of cover plate 140 is precluded. If the user desires to have access to flash memory card 301, then computer chassis 100 must be opened by opening or removing cover piece 120 such that access to the back side of chassis bezel 110 is obtained. Alternatively, chassis bezel 110 may be secured to chassis 100 using security screws and access to the back side of chassis bezel 110 may be gained by removing chassis bezel 110 from cover piece 120 using a security tool. Once access to the back side of chassis bezel 110 is obtained, cover plate 140 may be removed by squeezing biasing members 146 and 147 (and the corresponding tabs (not shown) on the other side of cover plate 140) together such that the tabs do not "catch" on the back side of chassis bezel 110. Once the tabs have been squeezed together, cover plate 140 may be removed by gently pulling out through the front of chassis bezel 110. As is illustrated in FIG. 4, cover plate 140 does not cover the entire surface of flash memory card 301, but only covers the portion of flash memory card 301 that is exposed outside of chassis bezel 110 and only so much of flash memory card 301 within the interior of computer chassis 100 as is necessary to secure cover plate 140 to chassis bezel 110.

Figure 5:
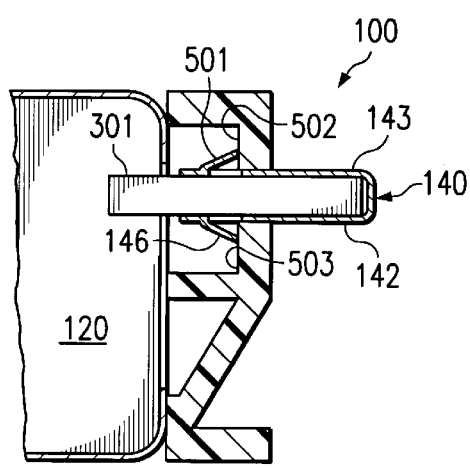
FIG. 5 shows a top view of a chassis bezel and a cover plate in accordance with a preferred embodiment of the present invention.

Turning now to FIG. 5, a top view of chassis bezel 110 and cover plate 140 is illustrated in accordance with a preferred embodiment of the present invention. Biasing member 146 and biasing member 501 (not shown in other figures) are depicted extended away from planer members 142 and 143 respectively. As shown, cover plate 140 has been inserted into chassis bezel 110 sufficiently to allow biasing members 146 and 501 to extend such that if removal of cover plate 140 is attempted, biasing members 146 and 502 (as well as other tabs not shown in this view) will catch on interior pieces 502 and 503 of chassis bezel 110.

Alternatively, the biasing members 146, 147, and 501 on cover plate 140 may be replaced with fixed slotted tabs and the interior pieces 502 and 503 of chassis bezel 110 may be replaced with spring back tabs. In this case, when cover plate 140 is inserted into chassis bezel 110 the spring back tabs within chassis bezel 110 will squeeze together to allow insertion of cover plate 140. Once cover plate 140 has been inserted sufficiently to allow the fixed slotted tabs of the cover plate to pass by the spring back tabs within chassis bezel 110, the spring back tabs will extend back out, thus engaging the fixed slotted tabs on cover plate 140 preventing removal of the cover plate. In this embodiment, when removal of the cover plate is desired, access to the spring back tabs within chassis bezel 110 must be acquired and the spring back tabs within chassis bezel 110 squeezed together as cover plate 140 is gently removed. Access to the spring back tabs within chassis bezel 110 may be acquired in a similar fashion as described above.

In an alternative embodiment, the cover plate may be secured to the chassis bezel using security screws rather than biasing members.

Other tamper proof mechanisms may also be used to secure the cover plate to the chassis bezel thus preventing unauthorized removal of the flash memory card. It should also be noted that the cover plate may be constructed from the same or from different materials as athe chassis bezel.

Although the present invention has been described aprimarily with reference to flash memory cards, it should be noted that the present invention may be applied to other types of removable electronic devices as well such as, for example, PCMCIAs or cartridges for video games.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer chassis, comprising:
   a chassis bezel; wherein
   said chassis bezel comprises a slotted opening disposed there through for user access to a user changeable component of a data processing system; and said chassis bezel is configured to accept a cover plate to cover said slotted opening to prevent access to said user changeable component.

2. The computer chassis as recited in claim 1, wherein said cover plate is not removable once installed without opening the computer chassis.

3. The computer chassis as recited in claim 1, wherein said cover plate comprises biasing members oriented to engage a part of said chassis bezel such that removal of said cover plate from said chassis bezel is prevented.

4. The computer chassis as recited in claim 1, wherein said cover plate is constructed from a plastic material.

5. The computer chassis as recited in claim 1, wherein said cover plate is mounted to said chassis bezel using screws.

6. The computer chassis as recited in claim 1, wherein said cover plate is mounted to said chassis bezel using a tamper proof mechanism.

7. The computer chassis as recited in claim 1, wherein said cover plate is constructed from the same material as said chassis bezel.

8. The computer chassis as recited in claim 1, wherein said cover plate is constructed from a different material than a material from which said chassis bezel is constructed.

9. The computer chassis as recited in claim 1, wherein said user changeable component is a flash memory card.

10. The computer chassis as recited in claim 1, wherein said cover plate comprises at least one biasing member to facilitate attachment to said chassis bezel.

11. The computer chassis as recited in claim 1, wherein said chassis bezel comprises biasing members for receiving and securing said cover plate to said chassis bezel.

12. The computer chassis as recited in claim 1, wherein
said cover plate comprises a first side, a second side, and a third side; wherein
an exposed surface of said first side is perpendicular to exposed surfaces of the second and third side of said cover plate;
the exposed surfaces of said second and third sides are parallel to each other; and
each of said second and third sides comprise a plurality of biasing members wherein a said biasing members are fixedly attached to a one of said second and third sides and a second end of said biasing members extends away from the surface of the respective side to which it is attached in a direction away from the other of said second and third sides.

13. The computer chassis as recited in claim 10, wherein said chassis bezel comprises interior pieces to engage said biasing member thereby preventing removal of said cover plate.

14. The computer chassis as recited in claim 11, wherein said biasing members are spring back tabs and wherein said cover plate comprises slots which may be engaged by said spring back tabs for securing said cover plate to said chassis bezel.

15. A cover plate for securing and preventing access to user accessible components of a data processing system, comprising:
a first side, a second side, and a third side; wherein
an exposed surface of said first side is substantially perpendicular to exposed surfaces of the second and third sides of said cover plate;
the exposed surfaces of said second and third sides are substantially parallel to each other; and
each of said second and third sides comprise a plurality of biasing members wherein a first end of said biasing members is fixedly attached to a one of said second and third sides and a second end of said biasing members extends away from the surface of the respective side to which it is attached in a direction away from the other of said second and third sides.

16. The cover plate as recited in claim 15, wherein said biasing members are spring back tabs.

* * * * *